United States Patent
Chang et al.

(10) Patent No.: US 9,755,214 B2
(45) Date of Patent: Sep. 5, 2017

(54) LITHIUM BATTERY CELL STRUCTURE

(71) Applicant: CHANGS ASCENDING ENTERPRISE CO., LTD., Taichung (TW)

(72) Inventors: Tsun-Yu Chang, Taichung (TW); Chun-Chieh Chang, Taichung (TW)

(73) Assignee: CHANGS ASCENDING ENTERPRISE CO., LTD., Taichung (TW)

( * ) Notice: Subject to any disclaimer, the term of this patent is extended or adjusted under 35 U.S.C. 154(b) by 151 days.

(21) Appl. No.: 14/648,846

(22) PCT Filed: Apr. 23, 2015

(86) PCT No.: PCT/CN2015/077294
§ 371 (c)(1),
(2) Date: Jun. 1, 2015

(87) PCT Pub. No.: WO2016/169024
PCT Pub. Date: Oct. 27, 2016

(65) Prior Publication Data
US 2017/0149041 A1    May 25, 2017

(51) Int. Cl.
*H01M 2/26*    (2006.01)
*H01M 2/02*    (2006.01)
(Continued)

(52) U.S. Cl.
CPC ........... *H01M 2/26* (2013.01); *H01M 2/1077* (2013.01); *H01M 2220/20* (2013.01)

(58) Field of Classification Search
CPC .................... H01M 2/20–2/22; H01M 2/0217
See application file for complete search history.

(56) References Cited

U.S. PATENT DOCUMENTS

2008/0261087 A1* 10/2008 Jang .................... H01M 2/0207
  429/7
2011/0287291 A1* 11/2011 Byun .................. H01M 2/0426
  429/94
(Continued)

FOREIGN PATENT DOCUMENTS

CN    201466126 U    5/2010
CN    202423472 U    9/2012
(Continued)

*Primary Examiner* — Matthew Merkling
(74) *Attorney, Agent, or Firm* — Muncy, Geissler, Olds & Lowe, P.C.

(57) ABSTRACT

A lithium battery cell structure is provided. A first-electrode conduction portion and a second-electrode conduction portion that are exposed outward are respectively provided on two sides of a soft package lithium battery inside the metal housing. The first-electrode conduction portions are respectively electrically connected and fixed to a first-electrode conductive sheet, and the first-electrode conductive sheet is electrically connected and fixed to a housing conductive sheet that is connected to the metal housing. The second-electrode conduction portions are respectively electrically connected and fixed to a second-electrode conductive sheet, and an other end of the second-electrode conductive sheet is electrically connected and fixed to the second electrode end. By adjusting the design of electrical connection between extending portions and the soft package lithium battery and the housing, the lithium battery cell is enabled to have better electrical conductivity and a better heat dissipation effect, and the sealing procedure made simpler.

5 Claims, 3 Drawing Sheets

(51) Int. Cl.
 *H01M 2/20* (2006.01)
 *H01M 2/10* (2006.01)

(56) References Cited

U.S. PATENT DOCUMENTS

2012/0156531 A1\* 6/2012 Guen .................. H01M 2/0426
 429/53
2012/0282502 A1\* 11/2012 Kim ........................ H01M 2/22
 429/82

FOREIGN PATENT DOCUMENTS

| CN | 202454641 U | 9/2012 |
| CN | 102956852 A | 3/2013 |
| CN | 103155208 A | 6/2013 |

\* cited by examiner

_(1)_

LITHIUM BATTERY CELL STRUCTURE

TECHNICAL FIELD

The present invention relates to a battery cell structure, and particularly to a battery cell structure of a prismatic lithium battery.

BACKGROUND

With the significant development of technologies related to lithium battery materials, secondary batteries have been made available as power sources that can meet high requirements on the electric quantity (for example, lithium iron phosphate oxide), and can be used in electric bicycles, electric wheelchairs, and other equipment having high requirements on the electric power. The battery cell of such a high-capacity lithium battery has larger electricity storage capacity and electricity supply capacity than those of traditional lithium batteries.

As shown in FIG. 1, an existing high-capacity prismatic lithium battery structure includes a plurality of soft package lithium batteries 10 (two soft package lithium batteries 10 are illustrated in the figure by way of example). The soft package lithium batteries 10 are each formed by a positive electrode layer, an isolation layer, and a negative electrode layer that are stacked together, and a positive-electrode conduction region 11 and a negative-electrode conduction region 12 are respectively provided on two sides of the soft package lithium battery 10. The soft package lithium batteries 10 are electrically connected to two extending portions 21 and 22 at two lower ends of a cover plate 20 by means of the positive-electrode conduction region 11 and the negative-electrode conduction region 12, and the extending portions 21 and 22 are respectively electrically connected to electrode ends 31 and 32 above the cover plate 20 by means of fasteners 22 (for example, rivets) that pass through the body of the cover plate 20, thereby obtaining an electrically conductive connection structure for discharging to the outside. In practice, insulation spacers 33 are provided below the electrode ends 31 and 32 above the cover plate 20, and an insulation block 40 and an insulation plate 41 are provided between the negative-electrode extending portion 22 and the electrode end 32 to avoid short circuits between the positive and negative electrodes.

Finally, the soft package lithium battery 10 is mounted at an opening of a housing 50 of a metal material, and the cover plate 20 and the periphery of the opening of the housing 50 are sealed by using different sealing techniques, for example, laser welding, thus obtaining an lithium battery cell structure of the secondary battery.

However, in the internal structure of an existing lithium battery cell structure, the extending portions 21 and 22 below the cover plate 20 are fixed below the cover plate 20, and the soft package lithium batteries 10 are respectively welded or connected to the extending portions 21 and 22 by means of the positive-electrode conduction region 11 and the negative-electrode conduction region 12 whose two sides are also perpendicular to the surface of the cover plate 20. Therefore, the extending portions 21 and 22 need to structurally correspond to the number of the soft package lithium battery 10; as two soft package lithium batteries 10 are illustrated in the figure by way of example, there are two extending portions 21 and 22 at two lower ends of the cover plate 20. Each cell 10 is sequentially welded or riveted to the extending portions 21 and 22 by means of the positive-electrode conduction region 11 and the negative-electrode conduction region 12. This welding or riveting process may lead to such problems as that the welding operation is time and labor consuming and that the positive-electrode conduction region 11 and the negative-electrode conduction region 12 cannot easily enter into electrical contact with the extending portions 21 and 22. In addition, to facilitate the installation of the soft package lithium battery 10 into the housing 50 during assembly, more space is needed inside the housing 50. The installation of the soft package lithium battery 10 into the housing 50 also often makes it not easy to implement the final sealing process.

SUMMARY

Accordingly, to solve the above defects, an objective of the present invention is to provide a lithium battery cell structure, in which the design of electrical connection between extending portions and a soft package lithium battery and a housing is adjusted, which enables the lithium battery cell to have better electrical conductivity, makes it easier to install the soft package lithium battery into the housing in limited space, and makes the final sealing procedure simpler.

To achieve the above objective, the present invention discloses a lithium battery cell structure, including: a prismatic metal housing, where one side edge inside the metal housing is electrically connected and fixed to a housing conductive sheet, and the housing conductive sheet is partially exposed at an opening of the metal housing; a plurality of soft package lithium batteries connected in parallel, where the soft package lithium batteries are installed in the metal housing, and two sides of each of the soft package lithium batteries are respectively provided with a first-electrode conduction portion and a second-electrode conduction portion that are exposed upward; the first-electrode conduction portions are respectively electrically connected to one end of a first-electrode conductive sheet, and an other end of the first-electrode conductive sheet is further electrically connected and fixed to the housing conductive sheet that is exposed out of the metal housing, so that the metal housing is electrically connected to a first electrode of the soft package lithium battery; and the second-electrode conduction portions are respectively electrically connected to one end of a second-electrode conductive sheet; and a metal cover, where a first electrode end and a second electrode end are provided above the metal cover; at the position of the second electrode end, an insulation plate set is provided below the metal cover to prevent the second-electrode conduction portion and the second-electrode conductive sheet from entering into contact with the metal cover and the metal housing; an other end of the second-electrode conductive sheet is electrically connected and fixed to the second electrode end; and the metal cover is electrically connected to and sealed at the opening of the metal housing.

The electrical connection and fixation is a welding procedure or a riveting procedure using rivets.

The metal housing and the first-electrode conduction portion of the soft package lithium battery are a positive electrode, and the second-electrode conduction portion of the soft package lithium battery is a negative electrode; for example, a lithium battery cell combined with a metal housing of an aluminum material. Alternatively, the metal housing and the first-electrode conduction portion of the soft package lithium battery are a negative electrode, and the second-electrode conduction portion of the soft package lithium battery is a positive electrode; for example, a lithium battery cell combined with a metal housing of a steel material.

The advantages of the present invention lie in that, the housing conductive sheet is connected to the metal housing, the first-electrode conduction portion of the soft package lithium battery is electrically connected and fixed to the housing conductive sheet by means of the first-electrode conductive sheet, and the second-electrode conduction portion of the soft package lithium battery is electrically connected to the second electrode end of the metal cover by means of the second-electrode conductive sheet. In this way, by adjusting the design of electrical connection between the soft package lithium battery and the housing, the lithium battery cell is enabled to have better electrical conductivity and a better heat dissipation effect. In addition, because only one side of the metal cover is electrically connected to the soft package lithium battery in the sealing procedure, the soft package lithium battery can be more easily installed into the housing when the space inside the metal housing is limited. Finally, after the metal cover is pressed downward to cover the opening of the metal housing, the final sealing procedure can be implemented more easily.

DETAILED DESCRIPTION OF DISCLOSED EMBODIMENTS

The detailed content and technical description of the present invention are further illustrated through embodiments, but it should be understood that these embodiments are described by way of example only, and should not be construed as limiting the implementation of the present invention.

Figure 1:
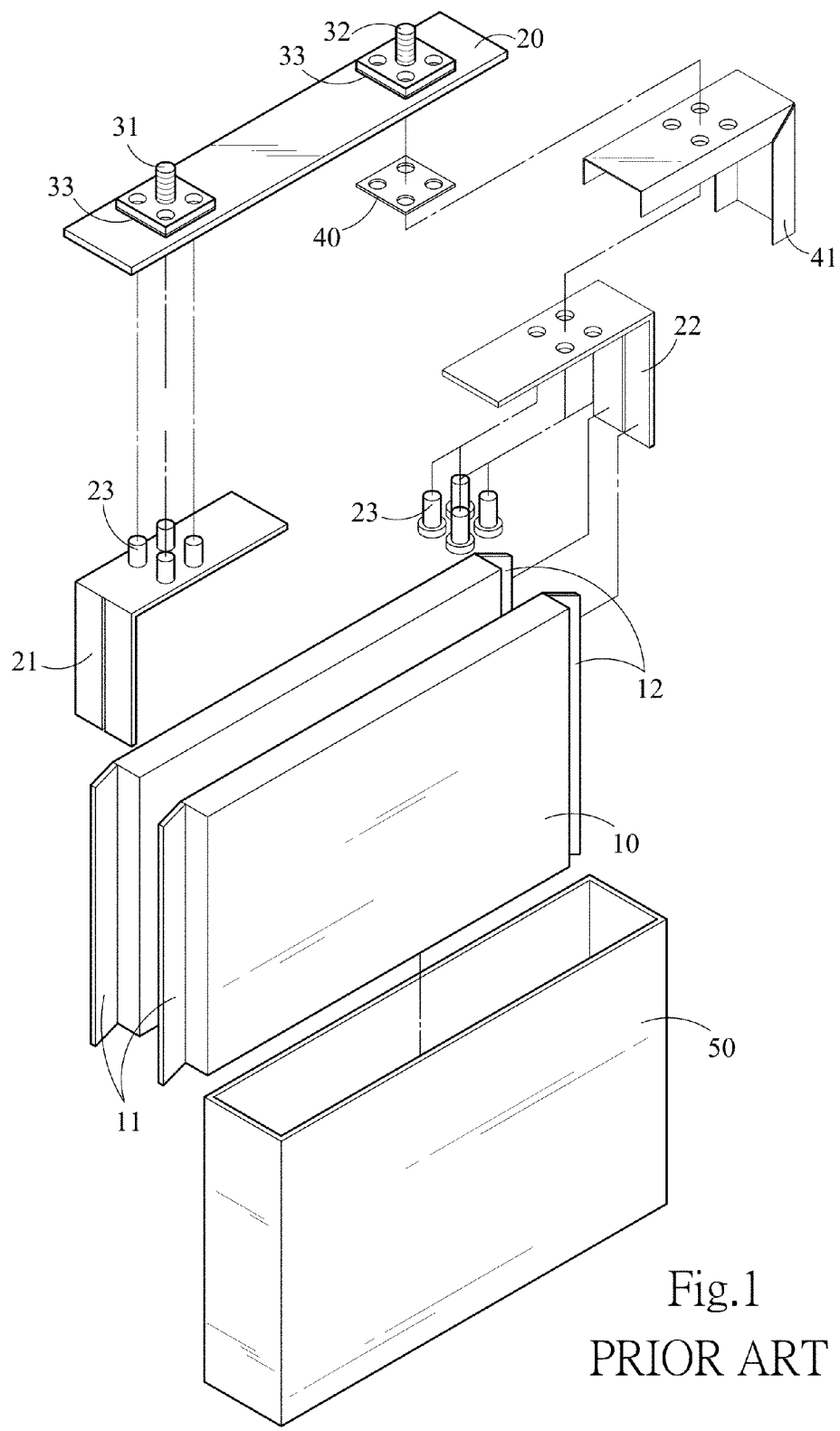
FIG. 1 is a schematic view of a lithium battery cell structure in the prior art.
Figure 2:
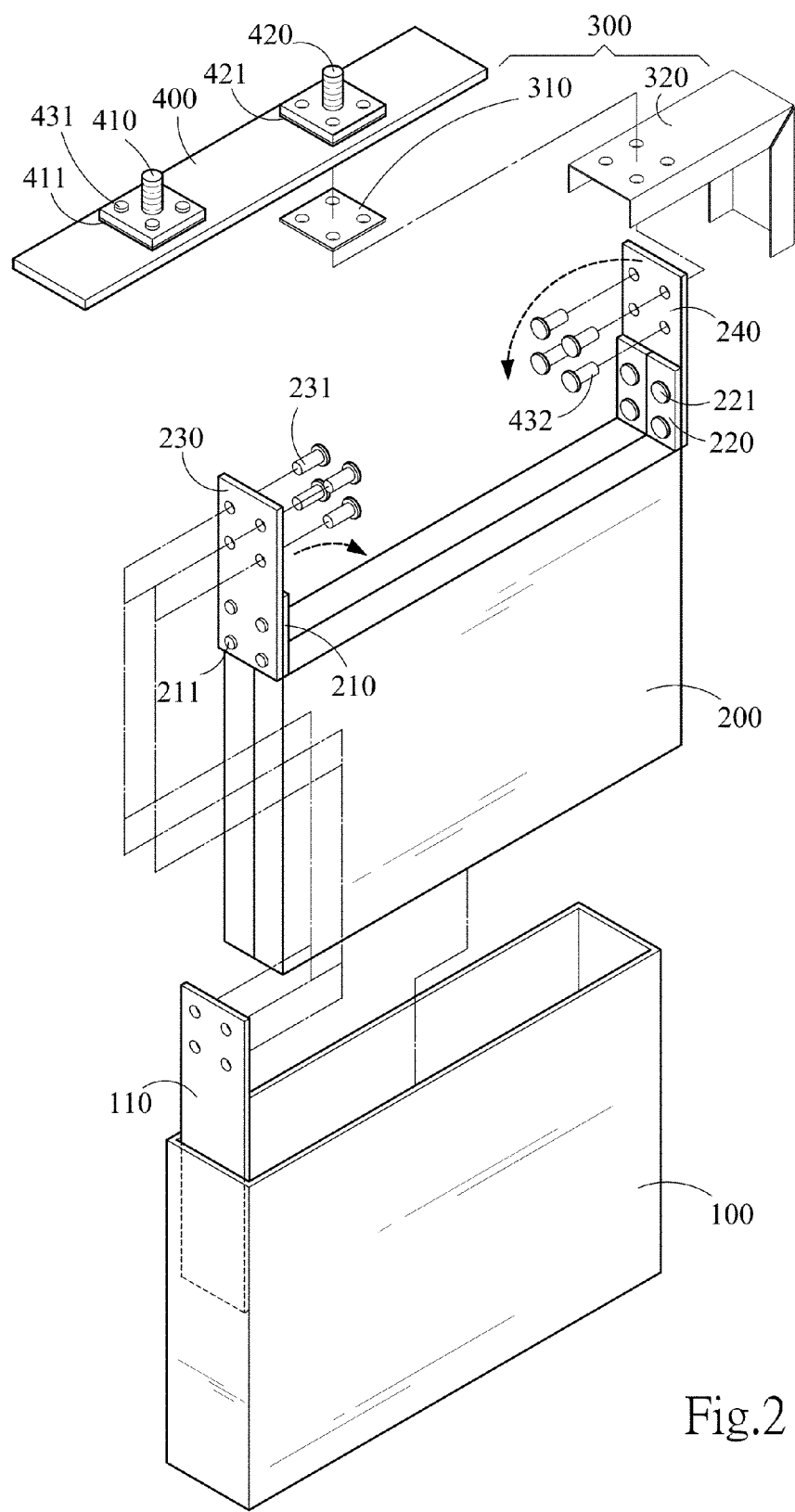
FIG. 2 is a schematic exploded view of a lithium battery cell structure according to the present invention.
Figure 3:
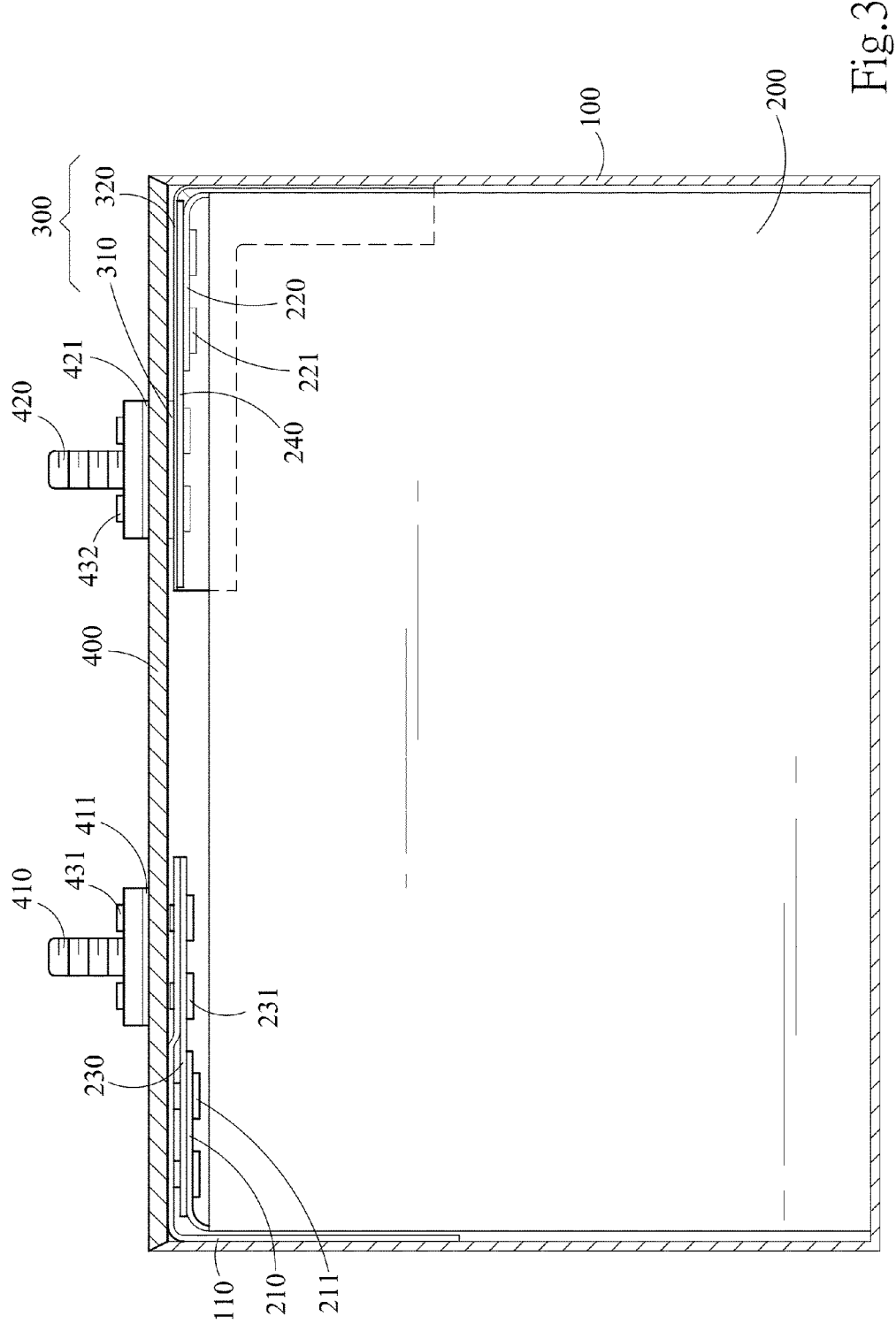
FIG. 3 is a schematic sectional view of a lithium battery cell structure according to the present invention.

FIG. 2 and FIG. 3 are schematic views of a lithium battery cell structure according to the present invention. The present invention discloses a lithium battery cell structure, including: a prismatic metal housing 100, where one side edge inside the metal housing 100 is electrically connected and fixed to a housing conductive sheet 110, and the housing conductive sheet 110 is partially exposed at an opening of the metal housing 100. To ensure the electrical connection between the metal housing 100 and the housing conductive sheet 110 without damaging the housing structure of the metal housing 100, the housing conductive sheet 110 is most preferably connected and fixed to the side edge inside the metal housing 100 by using a welding procedure.

The lithium battery cell structure includes a plurality of soft package lithium batteries 200 connected in parallel (two soft package lithium batteries 100 are illustrated in the figure by way of example). Generally, an existing soft package lithium battery 200 includes a housing made of an aluminum composite film and an electrode plate set (not shown in the figure) wrapped in the housing, and two sides of each of the soft package lithium batteries 200 are respectively provided with a first-electrode conduction portion 210 and a second-electrode conduction portion 220 that are exposed upward. The soft package lithium batteries 200 connected in parallel are installed in the metal housing 100.

The first-electrode conduction portions 210 of the soft package lithium batteries 200 are respectively electrically connected and fixed to one end of a first-electrode conductive sheet 230, and an other end of the first-electrode conductive sheet 230 is further electrically connected and fixed to the housing conductive sheet 110 that is exposed out of the metal housing 100, so that the metal housing 100 is electrically connected to the first-electrode conduction portion 210 of the soft package lithium battery 200. In practice, the above structure is fixed first, and then the housing conductive sheet 110 that is originally exposed at the opening of the metal housing 100 is partially bent to above the soft package lithium battery 200, to be received in the metal housing 100.

The electrical connection and fixation is a welding procedure or a riveting procedure. As shown in the figure, the first-electrode conduction portion 210 is connected and fixed to the first-electrode conductive sheet 230 by using rivets 211, and the first-electrode conductive sheet 230 is connected and fixed to the housing conductive sheet 110 by using rivets 231; however, in practice, the connection and fixation may also be implemented by welding.

In addition, the second-electrode conduction portions 220 of the soft package lithium batteries 200 are respectively electrically connected and fixed to one end of a second-electrode conductive sheet 240. Likewise, the electrical connection and fixation may be a welding procedure or a riveting procedure. As shown in the figure, the second-electrode conduction portion 220 is connected and fixed to the second-electrode conductive sheet 240 by using rivets 221.

The lithium battery cell structure includes a metal cover 400. A first electrode end 410 and a second electrode end 420 are provided above the metal cover 400. In practice, insulation plates 411 and 421 are respectively provided below the first electrode end 410 and the second electrode end 420 above the metal cover 400, and the first electrode end 410 may be fixed above the metal cover 400 by using rivets 431, so that the first electrode end 410 is electrically connected to the metal cover 400.

At the position of the second electrode end 420, an insulation plate set 300 is provided below the metal cover 400 to prevent the second-electrode conduction portions 220 and the second-electrode conductive sheet 240 from entering into contact with the metal cover 400 and the metal housing 100. In practice, the insulation plate set 300 most preferably includes an insulation block 310 provided on a lower surface of the metal cover 400 and a large insulation plate 320 bent to wrap the second-electrode conduction portions 220 and the second-electrode conductive sheet 240 to avoid short circuits between the positive and negative electrodes.

Furthermore, an other end of the second-electrode conductive sheet 240 is electrically connected and fixed to the second electrode end 420, and the second-electrode conductive sheet 240, the insulation plate 320, and the insulation block 310 that are below the metal cover 400 are riveted and fixed to the second electrode end 420 by using rivets 432 that pass through the second-electrode conductive sheet 240, the insulation plate 320, the insulation block 310 and the metal cover 400. Finally, the metal cover 400 is electrically connected to and sealed at the opening of the metal housing 100. For example, the metal cover 400 is sealed at the opening of the metal housing 100 by laser welding, thus obtaining the lithium battery cell structure.

In practice, the metal housing 100 and the first-electrode conduction portion 210 of the soft package lithium battery 200 are a positive electrode, and the second-electrode conduction portion 220 of the soft package lithium battery 200 is a negative electrode. For example, for a metal housing 100 of an aluminum material, the metal housing 100, the metal cover 400 and the first electrode end 410 can all be used as the positive electrode of a lithium battery cell, with the second electrode end 420 being used as the negative electrode of the lithium battery cell. Alternatively, the metal housing 100 and the first-electrode conduction portion 210 of the soft package lithium battery 200 are a negative electrode, and the second-electrode conduction portion 220 of the soft package lithium battery 200 is a positive electrode. For example, for a metal housing 100 of a steel material, the metal housing 100, the metal cover 400 and the first electrode end 410 can all be used as the negative electrode of a lithium battery cell, with the second electrode end 420 being used as the positive electrode of the lithium battery cell.

In the present invention, the design of electrical connection between the soft package lithium battery 200 and the metal housing 100 is adjusted in such a manner that: the housing conductive sheet 110 is connected to the metal housing 100, the first-electrode conduction portion 210 of the soft package lithium battery 200 is electrically connected and fixed to the housing conductive sheet 100 by means of the first-electrode conductive sheet 230. In this way, the lithium battery cell is enabled to have better electrical conductivity. In addition, due to the connection relationship between the soft package lithium battery 200 and the metal housing 100, heat generated by the soft package lithium battery 200 in the charging/discharging process can be dissipated through the metal housing 100, which improves the overall heat dissipation effect of the lithium battery cell and prolongs the service life of the lithium battery cell.

Moreover, in the manufacturing process, the second-electrode conduction portion 220 of the soft package lithium batteries 200 is electrically connected and fixed to the second electrode end 420 of the metal cover 400 by means of the second-electrode conductive sheet 240, and before the sealing procedure is performed, only the side of the metal cover 400 with the second electrode end 420 is connected and fixed to the soft package lithium battery 200; therefore, the soft package lithium battery 200 can be more easily installed into the metal housing 100 when the space inside the metal housing 100 is limited. Finally, after the metal cover 400 is pressed downward to bend the second-electrode conduction portion 220 so that the metal cover 400 covers the opening of the metal housing, the final sealing procedure can be implemented more easily, laser welding can be performed at the periphery of the metal cover 400, so that the opening of the metal housing 100 is sealed by the metal cover 400.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lithium battery cell structure, comprising:
a prismatic metal housing, wherein one side edge inside the prismatic metal housing is electrically connected and fixed to a housing conductive sheet, and the housing conductive sheet is partially exposed at an opening of the metal housing;
a plurality of soft package lithium batteries connected in parallel, wherein the soft package lithium batteries are installed in the metal housing, and two sides of each of the soft package lithium batteries are respectively provided with a first-electrode conduction portion and a second-electrode conduction portion that are exposed upward; the first-electrode conduction portions are respectively electrically connected to one end of a first-electrode conductive sheet, and an other end of the first-electrode conductive sheet is further electrically connected and fixed to the housing conductive sheet that is exposed out of the metal housing, so that the metal housing is electrically connected to a first electrode of the soft package lithium battery; and the second-electrode conduction portions are respectively electrically connected to one end of a second-electrode conductive sheet; and
a metal cover, wherein a first electrode end and a second electrode end are provided above the metal cover; at the position of the second electrode end, an insulation plate set is provided below the metal cover to prevent the second-electrode conduction portion and the second-electrode conductive sheet from entering into contact with the metal cover and the metal housing; an other end of the second-electrode conductive sheet is electrically connected and fixed to the second electrode end; and the metal cover is electrically connected to and sealed at the opening of the metal housing.

2. The lithium battery cell structure according to claim 1, wherein the electrical connection and fixation is a welding procedure.

3. The lithium battery cell structure according to claim 1, wherein the electrical connection and fixation is a riveting procedure.

4. The lithium battery cell structure according to claim 1, wherein the metal housing and the first-electrode conduction portion of the soft package lithium battery are a positive electrode, and the second-electrode conduction portion of the soft package lithium battery is a negative electrode.

5. The lithium battery cell structure according to claim 1, wherein the metal housing and the first-electrode conduction portion of the soft package lithium battery are a negative electrode, and the second-electrode conduction portion of the soft package lithium battery is a positive electrode.

* * * * *